United States Patent [19]

Rahimzadeh

[11] Patent Number: 5,681,368
[45] Date of Patent: Oct. 28, 1997

[54] DEHUMIDIFIER SYSTEM USING MEMBRANE CARTRIDGE

[75] Inventor: Ray A. Rahimzadeh, Arlington, Tex.

[73] Assignee: Andrew Corporation, Orland Park, Ill.

[21] Appl. No.: 498,146

[22] Filed: Jul. 5, 1995

[51] Int. Cl.$^6$ ............................................. B01D 53/22
[52] U.S. Cl. ............................ 95/19; 95/22; 95/39; 95/45; 95/52; 96/4; 96/8
[58] Field of Search ................................. 95/8, 10, 12, 19, 95/22, 23, 39, 45, 52; 96/4, 7, 8, 10

[56] References Cited

U.S. PATENT DOCUMENTS

| | | | |
|---|---|---|---|
| 2,779,173 | 1/1957 | Wurtz | 62/140 |
| 3,133,132 | 5/1964 | Loeb et al. | 264/49 |
| 3,208,230 | 9/1965 | Fourroux | 95/8 X |
| 3,237,376 | 3/1966 | Bauer | 95/23 X |
| 3,499,062 | 3/1970 | Geary et al. | 264/36 |
| 3,511,031 | 5/1970 | Ketteringham et al. | 55/158 |
| 3,536,611 | 10/1970 | DeFilippi et al. | 210/22 |
| 3,556,305 | 1/1971 | Schorr | 210/490 |
| 3,556,992 | 1/1971 | Massucco | 210/23 |
| 3,580,841 | 5/1971 | Cadotte et al. | 210/23 |
| 3,615,024 | 10/1971 | Michaels | 210/490 |
| 3,616,607 | 11/1971 | Klass et al. | 55/16 |
| 3,657,113 | 4/1972 | Stancell et al. | 210/23 |
| 3,659,399 | 5/1972 | Kauer, Jr. et al. | 95/19 |
| 3,676,203 | 7/1972 | Sachs et al. | 117/123 D |
| 3,735,558 | 5/1973 | Skarstrom et al. | 55/158 X |
| 3,735,559 | 5/1973 | Salemme | 55/158 X |
| 3,775,303 | 11/1973 | McKinney et al. | 208/210 |
| 3,775,308 | 11/1973 | Yasuda | 210/23 |
| 3,874,986 | 4/1975 | Browall et al. | 161/160 |
| 3,892,665 | 7/1975 | Steigelmann et al. | 210/490 |
| 3,899,309 | 8/1975 | Hoehn et al. | 210/500 |
| 3,922,149 | 11/1975 | Ruder et al. | 55/21 |
| 3,926,798 | 12/1975 | Cadotte | 210/23 |
| 3,930,814 | 1/1976 | Gessner | 55/21 X |
| 3,967,937 | 7/1976 | Hobbs | 95/23 X |
| 3,976,451 | 8/1976 | Blackmer et al. | 96/7 |
| 3,980,456 | 9/1976 | Browall | 250/500 |
| 4,108,765 | 8/1978 | Lee | 210/23 |
| 4,142,966 | 3/1979 | Perry | 210/22 |
| 4,157,960 | 6/1979 | Chang et al. | 210/23 |
| 4,194,890 | 3/1980 | McCombs et al. | 95/23 |
| 4,218,312 | 8/1980 | Perry | 210/22 |
| 4,230,463 | 10/1980 | Henis et al. | 210/500 |
| 4,311,594 | 1/1982 | Perry | 210/640 |
| 4,397,661 | 8/1983 | King et al. | 55/158 |
| 4,421,529 | 12/1983 | Revak et al. | 55/21 X |
| 4,472,175 | 9/1984 | Malon et al. | 55/16 |
| 4,472,176 | 9/1984 | Rubin | 55/16 |
| 4,486,202 | 12/1984 | Malon et al. | 55/158 |
| 4,497,640 | 2/1985 | Fournie et al. | 55/16 |
| 4,549,888 | 10/1985 | Fannin | 55/163 |
| 4,575,385 | 3/1986 | Brooks et al. | 55/158 |
| 4,583,996 | 4/1986 | Sakata et al. | 55/16 |

(List continued on next page.)

FOREIGN PATENT DOCUMENTS

| | | |
|---|---|---|
| A1 0030863 | 6/1981 | European Pat. Off. . |
| 00514694 | 5/1982 | European Pat. Off. ............ 55/16 |
| 0291630 | 11/1988 | European Pat. Off. . |
| 0409545 | 1/1991 | European Pat. Off. ............ 95/12 |
| A 2618082 | 1/1989 | France . |

(List continued on next page.)

Primary Examiner—Robert Spitzer
Attorney, Agent, or Firm—Arnold, White & Durkee

[57] ABSTRACT

The present invention utilizes a membrane cartridge that removes water vapor or fluid from air that passes through the cartridge. The longer the air remains within the cartridge, the more fluid is removed from the air. Consequently, as the air becomes "drier", the dew point temperature of the air also falls. The present invention permits decreases in the flow rate and system pressure while providing dehumidified air with the desired dew point temperature. These decreases in pressure and flow rate result from increased elevation or system wear. The decrease in system pressure and flow rate increases the residence time of the air in the membrane cartridge. As a result, the dew point temperature of the dehumidified air remains stable because increased residence time increases the amount of fluid removed from the air, which tends to reduce the dew point temperature of the dehumidified air.

18 Claims, 1 Drawing Sheet

U.S. PATENT DOCUMENTS

| | | | |
|---|---|---|---|
| 4,597,777 | 7/1986 | Graham | 55/16 |
| 4,614,524 | 9/1986 | Kraus | 55/16 |
| 4,654,055 | 3/1987 | Malon et al. | 55/158 |
| 4,685,941 | 8/1987 | Sato | 55/163 |
| 4,687,578 | 8/1987 | Stookey | 210/321 |
| 4,710,204 | 12/1987 | Kraus et al. | 55/16 |
| 4,718,921 | 1/1988 | Marino et al. | 55/16 |
| 4,728,345 | 3/1988 | Murphy | 55/158 |
| 4,783,201 | 11/1988 | Rice et al. | 55/16 |
| 4,793,830 | 12/1988 | Murphy et al. | 55/16 |
| 4,806,132 | 2/1989 | Campbell | 55/16 |
| 4,813,474 | 3/1989 | Umezu | 165/21 |
| 4,822,384 | 4/1989 | Kato et al. | 96/7 X |
| 4,844,719 | 7/1989 | Toyomoto et al. | 55/16 |
| 4,857,082 | 8/1989 | DiMartino, Sr. et al. | 55/21 X |
| 4,863,492 | 9/1989 | Dashi et al. | 55/21 X |
| 4,944,776 | 7/1990 | Keyser et al. | 55/16 |
| 4,950,315 | 8/1990 | Gollan | 96/10 X |
| 4,995,889 | 2/1991 | Abel et al. | 95/22 |
| 5,030,251 | 7/1991 | Rice et al. | 55/16 |
| 5,053,058 | 10/1991 | Mitariten | 55/18 X |
| 5,118,327 | 6/1992 | Nelson et al. | 55/16 |
| 5,131,929 | 7/1992 | Brockmann et al. | 55/16 |
| 5,258,056 | 11/1993 | Shirley et al. | 95/22 |
| 5,281,253 | 1/1994 | Thompson | 95/22 |
| 5,302,189 | 4/1994 | Barbe et al. | 95/22 X |
| 5,470,379 | 11/1995 | Garrett | 95/12 X |
| 5,474,595 | 12/1995 | McCombs | 95/23 |

FOREIGN PATENT DOCUMENTS

| | | | |
|---|---|---|---|
| B2 1919290 | 6/1980 | Germany . | |
| 3827005 | 2/1990 | Germany . | |
| 54-015349 | 2/1979 | Japan | 55/158 |
| 60-87898 | 5/1985 | Japan . | |
| 60-142899 | 7/1985 | Japan . | |
| 60-238119 | 11/1985 | Japan | 55/158 |
| 62-042723 | 2/1987 | Japan | 55/16 |
| 62-049929 | 3/1987 | Japan | 55/158 |
| 62-191404 | 8/1987 | Japan | 55/158 |
| 62-273028 | 11/1987 | Japan | 55/158 |
| 63-111923 | 5/1988 | Japan | 55/158 |
| 63-123418 | 5/1988 | Japan | 55/16 |
| 63-123421 | 5/1988 | Japan | 55/158 |
| 63-123422 | 5/1988 | Japan | 55/158 |
| 63-137729 | 6/1988 | Japan | 55/16 |
| 63-236517 | 10/1988 | Japan | 55/16 |
| 63-296819 | 12/1988 | Japan | 55/16 |
| 01-143624 | 6/1989 | Japan | 55/16 |
| 01-143625 | 6/1989 | Japan | 55/16 |
| 01-143626 | 6/1989 | Japan | 55/16 |
| 1271552 | 11/1986 | U.S.S.R. | 55/21 |
| 2086744 | 5/1982 | United Kingdom . | |
| 2265320 | 9/1993 | United Kingdom . | |

DEHUMIDIFIER SYSTEM USING MEMBRANE CARTRIDGE

FIELD OF THE INVENTION

The present invention relates generally to dehumidifying systems that use a membrane cartridge for dehumidifying air or other gases.

BACKGROUND OF THE INVENTION

Dehumidifying systems are used in a variety of different applications. For example, air dehumidifying systems are used in applications ranging from dehumidification of offices for maintaining comfortable working areas during summer months to providing dry air for dental tools. Different applications often require different levels of humidity. A humidity level of about 40% to 60% is comfortable in homes or offices, while a humidity level of less than 10% is desirable in certain laboratory situations. Even lower humidity levels are often desirable in communications systems.

Commonly used signal transmission media in communications systems are waveguide, coaxial cable, multi-wire telephone cables, and optical fiber cables. Changing environmental conditions can affect the overall performance of a system using any of these media. For example, when the temperature of air inside a waveguide or other transmission medium falls below its dew point, condensation occurs inside the transmission line. Condensation lowers the efficiency of waveguide and coaxial cable systems partially because the dielectric constant of water is greater than the dielectric constant of air, and partially because the condensation alters the impedance of the waveguide or coaxial cable and may produce signal variation or loss. In multi-wire cables, condensation can lower the insulation resistance and introduce undesirable leakage paths.

To prevent the accumulation of moisture in such systems, the transmission line is normally sealed and pressurized to prevent the ingress of moisture through any small gaps. To prevent condensation within the system, the pressurization is effected with dry air from a dehumidifier or dehydrator. A compressor or pump typically supplies the pressurized air, and the dehumidifying apparatus removes moisture from the pressurized air before it is injected into the system. The low moisture content of the air lowers the dew point so that condensation does not take place except at very low temperatures. Moreover, due to the small amount of moisture present in the injected air, only a small amount of condensate can form even at unusually low temperatures.

One of the known types of dehumidifiers uses a membrane cartridge to remove water vapor from a gas mixture that passes through the membrane cartridge. The membrane cartridge contains multiple membranes through which moisture and a portion of the gas being dried permeate the membrane and escape to the atmosphere or a collection system. The membranes are typically in the form of hollow fibers so that a gas may be passed through the interiors of the fibers while moisture removed from the gas is collected from the exteriors of the fibers.

Present dehumidifiers that use membrane cartridges generally use a compressor to supply pressurized air to the membrane cartridge. In a typical dehumidifier of this type, the desired dew point of the dehumidified gas is achieved by limiting the flow rate of the gas through the membrane cartridge while maintaining a minimum pressure differential. When leaks exist in the system receiving the dehumidified air, the air can be lost at such a rate that the dehumidification system cannot keep up with the leakage rate. This can cause the dehumidification system to run continuously until the compressor motor fails.

Another problem encountered in dehumidification systems of the type described above is disposing of the water removed from the air by the water filter that removes condensed water. The volume of water to be disposed of can be substantial, particularly when the ambient air is at a high temperature which enables the air to carry a large amount of moisture. When an air-to-air heat exchanger is used to cool the incoming air, the condensed moisture can be removed by filtering before the air enters the membrane cartridge, but it is still necessary to dispose of the liquid water removed from the air.

SUMMARY OF THE INVENTION

A primary object of this invention is to provide a dehumidifying system that uses a membrane dryer to remove moisture from the air that is supplied to a receiving system, and has a limited maximum flow rate of the dehumidified air to the receiving system regardless of the leakage rate in that system. Thus, air having the desired dew point is supplied to the receiving system at a controlled rate that is independent of the leakage rate in the receiving system, and independent of the pressure in that system.

Another object of the present invention is to provide such a dehumidifying system that protects the system from excessive operation failures, thereby reducing maintenance costs, while still maintaining the desired air conditions within the receiving system.

Still another object of the present invention is to provide such a dehumidifying system that facilitates disposal of the water that is removed from the ambient air before it is supplied to the receiving system. In this connection, a related object of the invention is to provide an improved water disposal system that reduces both the size and the cost of the dehumidification system.

Other objects and advantages of the present invention will become apparent upon reading the following detailed description and upon reference to the accompanying drawings.

In accordance with the present invention, the foregoing objectives are realized by providing a dehumidifying system that includes a membrane cartridge having an air inlet, a membrane that removes water vapor or other fluid from the air and passes dehumidified air through a dehumidified air outlet, and a fluid exit where water vapor or other fluid is drawn from the cartridge. A source of pressurized air, such as a compressor, is connected to the air inlet of the membrane cartridge. The water vapor is drawn from the membrane cartridge through a fluid exit, and the dehumidified air having the desired dew point exits through a dry air outlet.

A pressure regulator connected between the dry air outlet of the membrane cartridge and the receiving system maintains a substantially constant, preselected air pressure downstream of the regulator for all upstream pressures equal to or greater than the preselected pressure level. From the pressure regulator, the air is passed through a flow restriction device selected to provide a desired maximum downstream flow rate. Dry air is supplied to the receiving system at no greater than this flow rate regardless of the pressure or leakage rate in the receiving system.

In a preferred embodiment of the present invention, a compressor supplies pressurized air to the membrane cartridge via a filtration device which removes condensed water from the pressurized air before it reaches the membrane cartridge. The filtered air is passed through the membrane cartridge to remove water vapor from the air. The water vapor is drawn out by a vacuum pump. The moisture from the filtration device is passed through a heat exchanger which cools the hot compressed air from the compressor. The heat from the compressed air is used to evaporate the liquid water condensate, and at the same time the compressed air is cooled by extracting the heat of evaporation of the condensate from the compressed air. Consequently, a desired effect is produced in both fluids passing through the heat exchanger. The cooling of the compressed air condenses a portion of the moisture in the air, and the resulting condensate is removed from the air by the filtration device.

BRIEF DESCRIPTION OF THE DRAWING

The single FIGURE is a schematic diagram of a dehumidifying system embodying the present invention.

DETAILED DESCRIPTION OF THE PREFERRED EMBODIMENT

Figure 1:
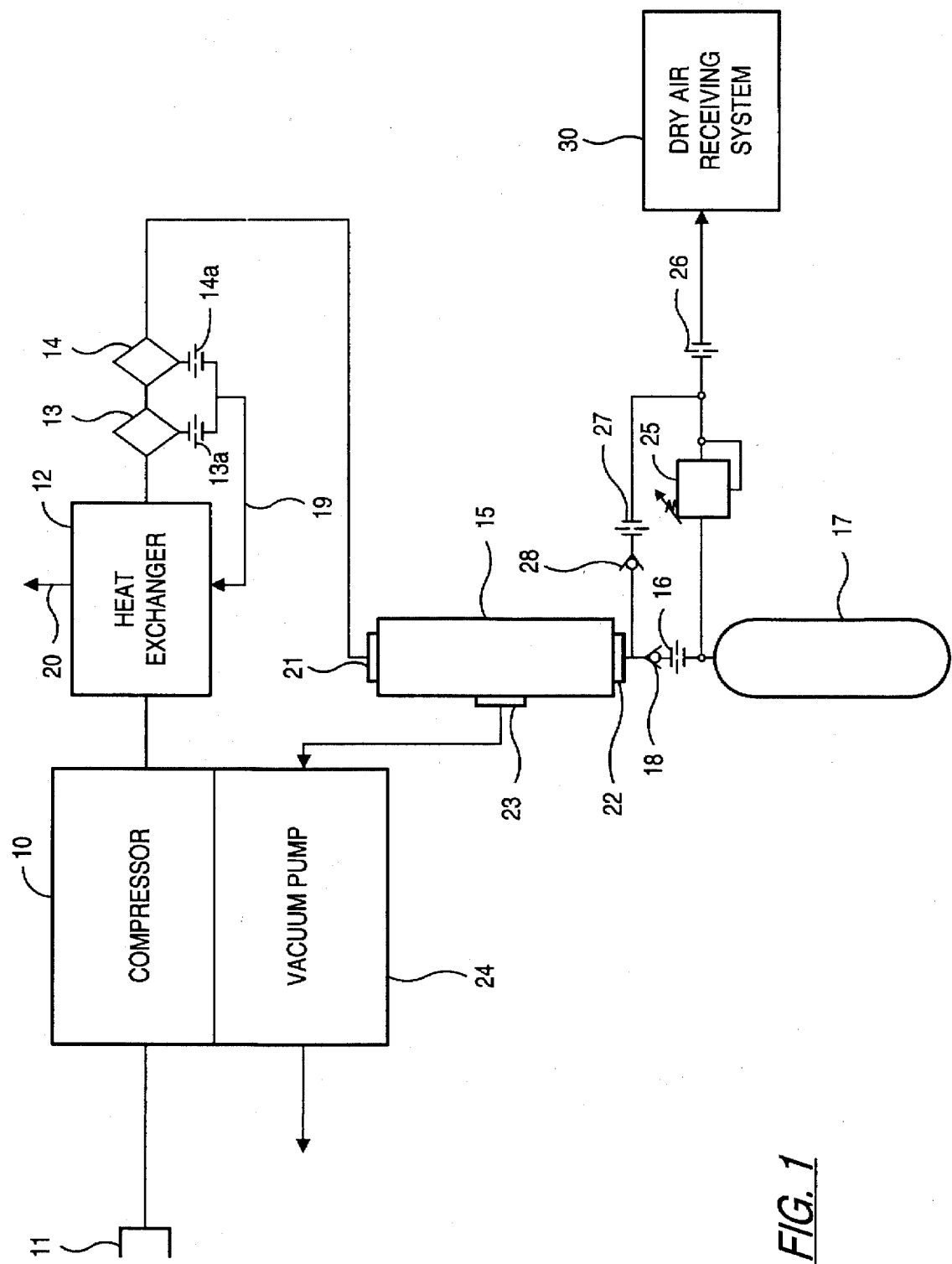

While the invention is susceptible to various modifications and alternative forms, a specific embodiment thereof has been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

The illustrative dehumidifier system will be described herein with specific reference to the dehumidification of air, but it will be understood that the system is generally applicable to the dehumidification of other gases or gas mixtures such as hydrogen, carbon dioxide, carbon monoxide, helium, nitrogen, oxygen, argon, hydrogen sulfide, nitronic oxides, ammonia, and hydrocarbons such as methane, ethane and propane.

Referring now to the drawing, an air compressor or pump 10 pressurizes air from the atmosphere which enters the compressor through an inlet 11. The hot compressed air delivered by the compressor 10 is routed through a heat exchanger 12 and a pair of filtration devices 13 and 14 to a membrane cartridge 15. The membrane cartridge 15 removes moisture from the pressurized air and routes the dehumidified air through a restrictive device 16 to an air reservoir tank 17 which provides a source for cyclic air reserve. The removed moisture is drawn away by a vacuum pump 24. When the compressor 10 is running, the mass flow of air out of the membrane 15 is about three times the maximum amount allowed through the regulator 25 and flow restriction 26. Therefore, when the compressor is running, there is an excess of dry air mass flow above what the unit is delivering to the dry air receiving system 30. This excess mass flow pressurizes the tank 17 to a preset pressure level at which point a pressure switch turns off the compressor. When the compressor is not running, the air supply for the regulator and flow restriction comes from the tank. Because of the pneumatic geometry of the system, air does not flow through or out of the tank while the compressor is running.

A check valve 18 prevents the loss of dehumidified air by allowing air to pass from the membrane cartridge 15 to the tank 17 but not in the reverse direction, from the tank 17 to the membrane cartridge 15. The pressurized air enters the filtration devices 13 and 14 that remove liquid water from the air. The liquid water is removed from the air to prevent it from possibly saturating the fiber membranes within the membrane cartridge 15, and to reduce the required residence time in the cartridge. Saturated fiber membranes cannot filter water vapor from the air, and thus removal of the liquid water prolongs the efficient operation of the membrane cartridge 15.

The liquid condensate from the two filtration devices 13 and 14 is supplied to the heat exchanger 12 through a pair of orifices 13a and 14a and a line 19, and then vented to the atmosphere through a vent line 20. Thus the heat exchanger 12 effects the transfer of heat from the hot compressed air to the liquid condensate, thereby simultaneously cooling the air and heating the condensate. The heating of the condensate converts the water from the liquid state to the gas state, so that the condensate is discharged to the atmosphere through the vent line 20 is in the form of water vapor. This eliminates the need for the evaporative pan that has been used in previous dehumidifier systems of this type, and significantly reduces both the cost and the size of the system. The cooling of the compressed air causes additional moisture to condense from the air, and this condensate is removed in the filtration devices 13 and 14. The use of the liquid condensate as the cooling medium for the hot compressed air enhances the cooling of the air, as compared with previously used air-to-air heat exchangers, because the heat of evaporation of the condensate is extracted from the compressed air. This increase in the condensation of moisture from the air in turn reduces the demand on the membrane cartridge for removal of the remaining moisture from the air.

Instead of vaporizing the liquid condensate in the heat exchanger, the condensate may be vaporized by passing it through the conduit through which the exhaust gas from the compressor is vented to the atmosphere. The heat from the exhaust gas converts the condensate from a liquid to a gas, which is then vented to the atmosphere.

The membrane cartridge 15 utilizes hollow fiber membranes to separate water vapor from air and expel it from the cartridge as water vapor. The hollow fiber membranes allow certain gases to permeate through the fiber and escape, while other gases continue through the hollow portion of the fiber. The hollow fiber membranes extend from an air inlet 21 to an air outlet 22 so that only air which travels within the hollows of the fibers is available for induction into the dry air receiving system 30. Gases, such as water vapor, which permeate through the walls of the fibers, are drawn from the cartridge 15 through a weep hole 23 and by the vacuum pump 24.

The membrane cartridge 15 requires a pressure differential across the membrane to force the water vapor through the pores of the membrane surface. This differential is created by the compressor 10 providing feed air flow above atmospheric pressure in combination with a vacuum pump 24 lowering the output pressure below atmospheric pressure. The compressor 10 and the vacuum pump 24 are built into the same housing (a twin head compressor with one of the heads flowing backwards). This not only augments the pressure differential, but also strips the water vapor away from the cartridge 15 which helps prevent membrane resaturation after the compressor shuts off.

The cartridge 15 may be provided with a different membrane and/or treatments for certain of these gases, as described for example in U.S. Pat. Nos. 4,230,463; 4,472,175; 4,486,202; 4,575,385; 4,597,777; 4,614,524; 4,654,055 and 4,728,345. The preferred membrane cartridge is commercially sold under the tradename "Prism Cactus" by Permea Inc., Malvern Industrial Park, Box 396, Malvern, Pa. 19355. In a preferred embodiment of the present invention, a Permea membrane cartridge Model PPC21 is used. Using this type of membrane cartridge, gases such as water vapor, hydrogen, helium and carbon dioxide permeate the fiber membrane quickly, while gases such as carbon monoxide, nitrogen and methane permeate the fiber membrane slowly. Consequently, as the air spends more time within the membrane cartridge, the air becomes more dehumidified, and the dew point of the air decreases.

Connected between the membrane cartridge 15 and the dry air receiving system 30 is a pressure-regulating valve 25 which maintains a substantially constant, preselected air pressure downstream of the valve, for all upstream pressures equal to or greater than a preselected pressure level. This pressure regulating valve 25 is followed by a restrictive orifice 26 which controls the maximum flow rate of the dry air into the receiving system 30. The orifice 26 has a diameter that is selected to provide the desired maximum flow rate, at the constant pressure controlled by the pressure-regulating valve 25. Thus, it is the combination of the substantially constant pressure controlled by the valve 25 and the restriction of the orifice 26 that provides the fixed maximum flow rate. This flow rate varies somewhat with changes in temperature and the gas composition.

A flow restriction device 27 and check valve 28 form a return loop whereby low pressure dehumidified air from the regulator 25 is fed back into the membrane cartridge 15 during the time that the compressor 10 is not running. This air flow further dries the membrane cartridge 15 and allows the system to achieve lower dew points of the delivered air.

With this system, dry air at a specified dew point is supplied to the receiving system 30 at a substantially fixed maximum flow rate regardless of the pressure in the receiving system 30, and thus regardless of the leakage rate in the receiving system 30. Consequently, if the receiving system 30 becomes increasingly leaky with the passage of time, due to either gradual deterioration or more drastic changes such as those caused by vandalism (e.g., bullet holes in a waveguide system), dry air continues to be supplied to the receiving system at the same maximum flow rate. Thus, the dehumidifying system is not exposed to excessive demands which can exceed the capacity of the dehumidification system and cause it to run continuously until the compressor motor or some other part of the system fails. The end result is a significant reduction in maintenance requirements with attendant operating cost reductions.

The dry air-receiving system 30 is preferably a tightly sealed system, such as a waveguide system (or other signal transmission media). A pressurized sealed system prevents humid atmospheric air from seeping into the system, thereby preserving the low humidity level of the air. Since the dehumidified air cannot rapidly escape from the sealed system, the compressor 10 does not need to operate continuously in order to effectively dehumidify the air supplied to the system. Therefore, in order to optimize the efficiency of the dehumidifier, the compressor 10 can be operated intermittently. This intermittent operation may be cyclical, using a simple control which automatically switches the compressor 10 on and off at regular time intervals. Alternately, a pressure sensor within the dry air system can trigger the switching on and off of compressor 10.

I claim:

1. A method for producing dehumidified air and maintaining a suitable dew point for said dehumidified air for a dry air system, comprising the steps of:
   supplying pressurized air to be dehumidified;
   passing the air to be dehumidified through a membrane cartridge having a membrane that removes water vapor or other fluid from the air that enters said membrane cartridge through an air inlet, said membrane cartridge having a dehumidified air outlet where said dehumidified air is expelled from said membrane cartridge and further including a fluid exit where water vapor or other fluid is expelled from said membrane cartridge;
   receiving the dehumidified air from said air outlet of said membrane cartridge and maintaining a substantially constant air pressure downstream of a selected pressure-regulating point independent of pressure differentials and leakage rates in said dry air receiving system; and
   controlling the flow rate of the dehumidified air downstream of said pressure-regulating point.

2. The method of claim 1 wherein said step of supplying pressurized air includes the use of a compressor.

3. The method of claim 1 wherein said flow rate of the dehumidified air is controlled by a restrictive orifice.

4. A method for producing dehumidified air and maintaining a suitable dew point for said dehumidified air for a dry air system, comprising the steps of:
   supplying pressurized air to be dehumidified;
   cooling the pressurized air;
   removing condensate from the cooled pressurized air;
   vaporizing the removed condensate by using said condensate for cooling of the pressurized air;
   passing the cooled pressurized air through a membrane cartridge having a membrane that removes water vapor or other fluid from the air that enters said membrane cartridge through an air inlet, said membrane cartridge having a dehumidified air outlet where said dehumidified air is expelled from said membrane cartridge and further including a fluid exit where water vapor or other fluid is expelled from said membrane cartridge;
   receiving the dehumidified air from said air outlet of said membrane cartridge and maintaining a substantially constant air pressure downstream of a selected pressure-regulating point; and
   controlling the flow rate of the dehumidified air downstream of said pressure-regulating point.

5. A method of supplying dehumidified air to a receiving system comprising the steps of:
   supplying air to be dehumidified from a pressurized air source;
   passing the air to be dehumidified through a membrane cartridge having a membrane that removes water vapor or other fluid from the air that enters said membrane cartridge through an air inlet, said membrane cartridge having a dehumidified air outlet where said dehumidified air is expelled from said membrane cartridge and further including a fluid exit where water vapor or other fluid is expelled from said membrane cartridge;
   restricting the dehumidified air expelled from said membrane cartridge to a substantially constant output pressure and flow rate to be supplied to the receiving system, said dehumidified air expelled from said membrane cartridge generally exceeding the dehumidified air supplied to the receiving system and defining an amount of excess air;
   receiving said excess air in a reservoir tank, said excess air accumulating in said reservoir tank to define a pressure level within said reservoir tank, said pressure level varying between a minimum value and a maximum value;
   intermittently turning on and off said pressurized air source in response to variations in said pressure level within said reservoir tank, said pressurized air source being turned off when said pressure level reaches said maximum value, said reservoir tank supplying dehumidified air to said receiving system when said pressurized air source is turned off, said pressurized air source being turned back on when said pressure level reaches said minimum value.

6. An apparatus for producing dehumidified air for delivery to a dry air receiving system and maintaining a dew point for said dehumidified air that is suitable for said dry air receiving system, said apparatus comprising:

a membrane cartridge having an air inlet where air enters said membrane cartridge, said membrane cartridge including a membrane that removes water vapor or other fluid from the air that enters said membrane cartridge through said air inlet and passes dehumidified air through a dehumidified air outlet where said dehumidified air is expelled from said membrane cartridge and further including a fluid exit where water vapor or other fluid is expelled from said membrane cartridge;

a source of pressurized air connected to said air inlet of said membrane cartridge;

pressure regulating means connected to said air outlet of said membrane cartridge for maintaining a substantially constant, preselected air pressure downstream of said regulating means independent of pressure differentials and leakage rates in said dry air receiving system; and a restrictive device between said pressure regulating means and the dry air receiving system for controlling the flow rate of the dehumidified air into said dry air receiving system.

7. The apparatus of claim 6 wherein said source of pressurized air is a compressor.

8. The apparatus of claim 6 wherein said restrictive device is an orifice having a diameter selected to provide the desired flow rate.

9. The apparatus of claim 6 which includes a vacuum pump connected to said fluid exit of said membrane cartridge for drawing said water vapor or other fluid through said membrane and out of said cartridge.

10. The apparatus of claim 6 wherein said pressurized air source is operated intermittently in response to air pressure levels within an air tank, said pressurized air source operating when said air pressure levels remain below a preset pressure level, said pressurized air source not operating when said air pressure levels within said air tank reach said preset pressure level, said air tank being connected to said air outlet of said membrane cartridge and to an inlet to said pressure regulating means for supplying said dehumidified air to said receiving system when said pressurized air source is not operating.

11. The apparatus of claim 10 which includes a return line connecting an outlet of said pressure regulating means to said air outlet of said membrane cartridge for returning said dehumidified air to said cartridge when said pressurized air source is not operating.

12. The apparatus of claim 11 wherein said return line includes a restrictive device for limiting the flow rate of said dehumidified air returned to said cartridge.

13. The apparatus of claim 10 wherein said restrictive device is an orifice having a diameter selected to provide the desired flow rate.

14. An apparatus for producing dehumidified air and maintaining a dew point for said dehumidified air that is suitable for a dry air system, said apparatus comprising:

a membrane cartridge having an air inlet where air enters said membrane cartridge, said membrane cartridge including a membrane that removes water vapor or other fluid from the air that enters said membrane cartridge through said air inlet and passes dehumidified air through a dehumidified air outlet where said dehumidified air is expelled from said membrane cartridge and further including a fluid exit where water vapor or other fluid is expelled from said membrane cartridge;

a source of pressurized air connected to said air inlet of said membrane cartridge;

a heat exchanger for cooling the pressurized air from said source before the air enters the membrane cartridge;

means for removing condensate from the cooled pressurized air before the air enters the membrane cartridge; and means for passing the removed condensate through said heat exchanger to vaporize said condensate with heat extracted from said pressurized air;

pressure regulating means connected to said air outlet of said membrane cartridge for maintaining a substantially constant, preselected air pressure downstream of said regulating means; and a restrictive device between said pressure regulating means and the system receiving the dehumidified air for controlling the flow rate of the dehumidified air into said system.

15. The apparatus of claim 14 wherein said means for removing condensate is a filtration device.

16. An apparatus for producing dehumidified air and maintaining a dew point for said dehumidified air that is suitable for a dry air system, said apparatus comprising:

a membrane cartridge having an air inlet where air enters said membrane cartridge, said membrane cartridge including a membrane that removes water vapor or other fluid from the air that enters said membrane cartridge through said air inlet and passes dehumidified air through a dehumidified air outlet where said dehumidified air is expelled from said membrane cartridge and further including a fluid exit where water vapor or other fluid is expelled from said membrane cartridge;

a compressor connected to said air inlet of said membrane cartridge, said compressor adapted to produce hot exhaust gas, and including,
means for removing condensate from the pressurized air before the air enters the membrane cartridge, and
means for vaporizing the removed condensate with the heat from said hot exhaust gas;

pressure regulating means connected to said air outlet of said membrane cartridge for maintaining a substantially constant, preselected air pressure downstream of said regulating means; and a restrictive device between said pressure regulating means and the system receiving the dehumidified air for controlling the flow rate of the dehumidified air into said system.

17. The apparatus of claim 16 wherein said means for removing condensate is a filtration device.

18. An apparatus for producing dehumidified air and maintaining a dew point for said dehumidified air that is suitable for a dry air system, said apparatus comprising:

a membrane cartridge having an air inlet where air enters said membrane cartridge, said membrane cartridge including a membrane that removes water vapor or other fluid from the air that enters said membrane cartridge through said air inlet and passes dehumidified air through a dehumidified air outlet where said dehumidified air is expelled from said membrane cartridge and further including a fluid exit where water vapor or other fluid is expelled from said membrane cartridge;

a source of pressurized air connected to said air inlet of said membrane cartridge, a heat exchanger for cooling the pressurized air from said source before the air enters the membrane cartridge;

means for removing condensate from the cooled pressurized air before the air enters the membrane cartridge; and means for passing the removed condensate through said heat exchanger to vaporize said condensate with heat extracted from said pressurized air.

* * * * *